Oct. 31, 1950   J. I. HERZLINGER   2,528,142
SYSTEM FOR TRANSMITTING POSITIONAL DATA
Filed July 29, 1948
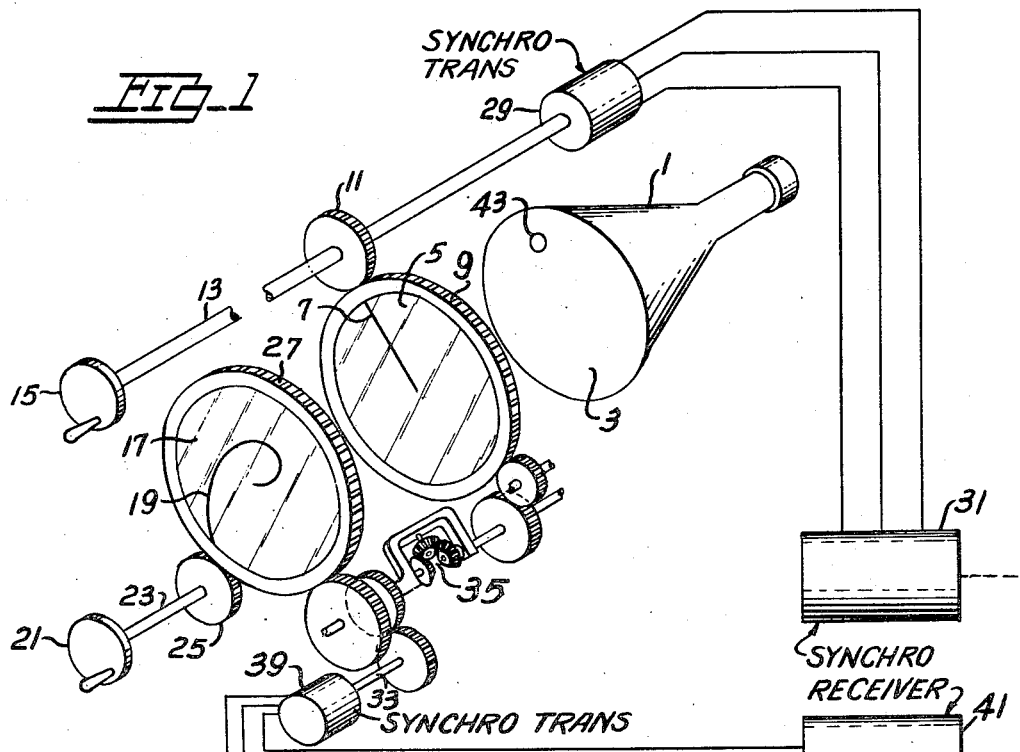
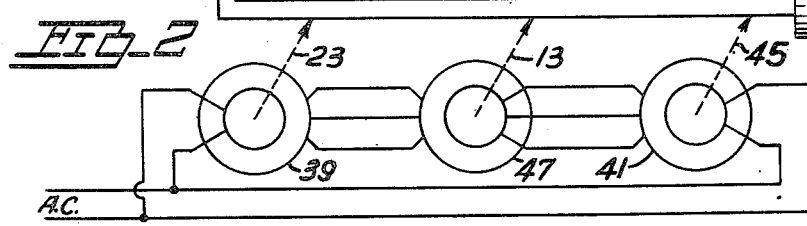
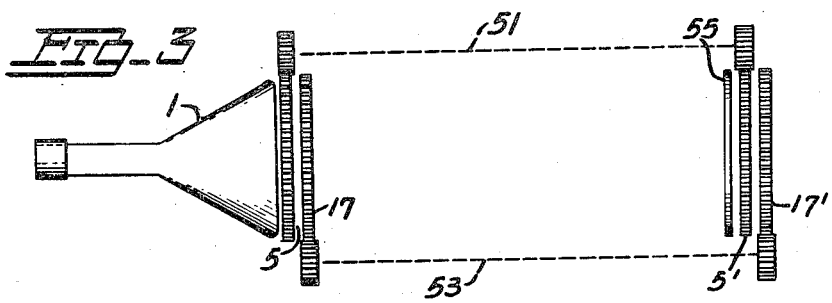
Inventor
JOSEPH I. HERZLINGER
By J. L. Whittaker
Attorney Patented Oct. 31, 1950

2,528,142

UNITED STATES PATENT OFFICE 2,528,142

SYSTEM FOR TRANSMITTING POSITIONAL DATA

Joseph I. Herzlinger, Oaklyn, N. J., assignor to Radio Corporation of America, a corporation of Delaware Application July 29, 1948, Serial No. 41,304

6 Claims. (Cl. 177—337)

1

This invention relates to systems for transmission of positional data, and more particularly to improvements in the art of transmitting polar coordinate information from one location to another.

Certain types of radar or radio locator systems provide visual displays consisting of luminous spots or "pips" representing the objects detected. The position of a pip with respect to some reference point such as the center of the display indicates the location of the respective object with reference to the radar station. The display may show range against azimuth, where the distance of the pip from the center of the display represents range and the direction represents azimuth (the so called "PPI" or plan position indication), elevation against azimuth, wherein the radial distance represents the elevation angle of the object, or various other pairs of coordinates. It is sometimes desired to secure the positional coordinates of a pip from the radar display and utilize them elsewhere, for example to indicate a point on a map, or to orient a gun, a directive antenna, or perhaps a searchlight.

The principal object of the present invention is to provide improved methods and apparatus for converting the positional coordinates of a point in a reference frame to a form suitable for transmission to a remote location by means of rotatable shafts or by electrical or other signals under the control of such shafts.

Another object is to provide means for reproducing positional data of the described type at a location remote from the station where it originates.

A further object of this invention is to provide systems of the described type which involve a minimum of gearing or other mechanical complications but are nevertheless simple to operate.

The invention will be described with reference to the accompanying drawing wherein:

Figure 1 is an exploded view in perspective of a preferred embodiment of the invention, Figure 2 is a schematic circuit diagram illustrating a modification of the system of Figure 1, and Figure 3 is a schematic view of a further embodiment of the invention in a remote indicating system.

Referring to Figure 1, a cathode ray oscilloscope tube 1 may be connected to a radar set (not shown) or other source of signals for producing a visual display comprising one or more luminous spots or "pips" on its screen 3. Closely adjacent the screen 3 is a cursor, which in the present example comprises transparent disc 5, rotatable about an axis extending through the center of the screen 3 and provided with a radial indicator line 7 extending outwardly from said axis. The disc 5 is surrounded by and may be supported by a ring gear 9 engaged by a pinion 11. The pinion 11 is secured to a shaft 13 which may be driven by a manually rotatable handle 15 to rotate the line 7.

A second cursor, which in the present example comprises a transparent disc 17 provided with a spiral indicator line 19, is supported parallel to and closely adjacent the disc 5. The disc 17 may be rotated by means of a handle 21 coupled thereto by a shaft 23 and gears 25 and 27.

The motion of shaft 13 is transmitted to a remote location either by direct shaft connections or by other suitable means such as a synchro transmitter 29 which is connected to a synchro receiver 31 at the remote location. In the system of Figure 1 the rotation of the shaft 23 is not transmitted directly to the remote location. A third shaft 33 is connected through differential gearing 35 to both ring gears 9 and 27 in such manner that the angular position of the shaft 33 depends upon the difference between the angular positions of the discs 5 and 17. The rotation of the shaft 33 is transmitted to the remote location in the same manner as that of the shaft 13, for example, by interconnected synchro machines 39 and 41. The output shafts of the synchro receivers 31 and 41 are connected to suitable utilization devices (not shown) such as indicators calibrated in terms of azimuth and range respectively.

The operation of the system of Figure 1 is as follows: Assume that the polar coordinates (such as range and azimuth) of an object represented by the "pip" 43 on the screen 3 are to be transmitted. The handle 15 is operated to rotate the line 7 on the disc 5 so as to extend directly over the pip 43. The total rotation of the line 7 from its indicial position is a measure of the directional or azimuth coordinate. The handle 21 is operated to rotate the disc 17 so that the spiral 19 extends over the pip 43, intersecting the line 7 at that point. If the line 7 remained in its indicial position, the amount of rotation of the disc 17 required to make the spiral 19 intersect the line 7 at the proper radius would be solely dependent upon said radius.

Since the line 7 can also rotate, the angular position of the disc 17 must be referred to that of the disc 5 with respect to its indicial position in order to have a fixed relationship to the radial position of the pip 43. This operation is performed by the differential gearing 35, which turns the shaft 33 through an angle equal or proportional to the difference between the angular rotations of the discs 5 and 17. Thus the position of the shaft 33 with respect to its indicial position is a function only of the radial distance of the point 43 from the center of the screen 3. The output shafts of the synchro receivers 31 and 41 are accordingly rotated to positions corresponding to the azimuth and range respectively of the target represented by the pip 43.

The differential 35 may be omitted, and its function performed by other means in the connection between the disc 17 and the output shaft 45. For example, as indicated in Figure 2, the shaft 23 may be connected directly to the synchro transmitter 39, and a differential synchro machine 47 may be included in the connection between the transmitter 39 and the receiver 41. The rotor of the differential synchro 47 is connected directly to the shaft 13. The connections between the three synchro machines are such that the rotation of the shaft 45 is the difference between the rotations of the shafts 13 and 23.

A structure similar to that of Figure 1 may be used to reproduce in polar coordinates the position of the spot in the original display. This is useful for example when it is desired to observe the position of an object with reference to a chart or map. Referring to Figure 3, the discs 5 and 17 are connected as indicated schematically by dash lines 51 and 53 respectively to similar discs 5' and 17' at the remote location. The relationship of the discs 5' and 17' with respect to each other is similar to that betwen the discs 5 and 17. A map or chart 55 is placed adjacent the discs 5' and 17' in a position corresponding to that of the screen of the tube 1 with respect to the discs 5 and 17.

The connections 51 and 53 may include synchro mechanisms, or may be simply direct mechanical connections. Since the positions of the corresponding discs at the two locations are alike, the intersection between the radial line and the spiral line at both locations will be the same, and no differential mechanism is required in the connections between the discs 17 and 17'.

I claim as my invention:

1. A data transmission system, wherein the data to be transmitted include the values of an angle and of a linear radial distance comprising the polar coordinates of a point such as a luminous spot on the screen of a cathode ray indicator tube, comprising at a first location a transparent disc bearing a radial indicator line and centered on the origin of said polar coordinates, said disc being rotatable about its center by an amount representing a value for said angle to make said indicator line extend over said point, a second transparent disc closely adjacent said first disc and bearing an indicator line in the form of an archimedian spiral, said second disc being rotatable with respect to said first disc to make said spiral intersect the radial line on said first disc at said point, whereby the difference in the angular positions of said discs is proportional to the radial distance of said point from said origin, differential means coupled to said discs and provided with a shaft which is maintained thereby at an angle, with respect to a reference position, proportional to said difference in the positions of said discs, a second shaft coupled to said first mentioned disc; at a second location, first and second rotatable elements respectively corresponding to said first-mentioned and said second shafts and means for rotating said elements respectively in accordance with the rotations of said shafts.

2. A data transmission system, wherein the data to be transmitted include the values of an angle and of a linear radial distance which together comprise the polar coordinates of a point such as a luminous spot on the screen of a cathode ray indicator tube, comprising, at a first location a cursor including a linear index which is radial with respect to the origin of said polar coordinates, said cursor being rotatable about said origin to make said indicator line extend over said point, a second cursor closely adjacent said first cursor and including an index in the form of an archimedian spiral whose origin substantially coincides with that of said polar coordinates, said second cursor being rotatable with respect to said first cursor to make said spiral intersect the radial index on said first cursor adjacent said point, whereby the difference in the angular positions of said cursors is proportional to the radial distance of said point from said origin, differential means coupled to said cursors and provided with a shaft which is maintained thereby at an angle, with respect to a reference position, proportional to said difference in the positions of said cursors, a second shaft coupled to said first mentioned cursor; at a second location, first and second rotatable elements respectively corresponding to said first-mentioned and said second shafts and means for rotating said elements respectively in accordance with the rotations of said shafts.

3. In apparatus for positioning two shafts respectively in accordance with the values of an angle and of a radial distance which together comprise the polar coordinates of a point on a reference plane, a cursor including a linear index which is radial with respect to the origin of said polar coordinates and adjacent said plane, said cursor being rotatable about said origin to make said indicator line extend over said point, a second cursor closely adjacent said first cursor and including an index in the form of a spiral whose origin substantially coincides with that of said polar coordinates, said second cursor being rotatable with respect to said first cursor to make said spiral intersect the radial index on said first cursor over said point, whereby the difference in the angular positions of said cursors is a function of the radial distance of said point from said origin, means coupling one of said shafts to said first mentioned cursor for rotation therewith, and means coupling the other of shafts to both of said cursors differentially.

4. In apparatus for positioning two shafts respectively in accordance with the values of an angle and of a radial distance which together comprise the polar coordinates of a point on a reference plane, a cursor including a linear index which is radial with respect to the origin of said polar coordinates and adjacent said plane, said cursor being rotatable about said origin to make said index extend over said point, a second cursor adjacent said first cursor and including an index in the form of a spiral, said second cursor being rotatable with respect to said first cursor to make said spiral intersect the radial index on said first cursor over said point, means coupling one of said shafts to said first mentioned cursor for rotation therewith, and means including differential gearing coupling the other of shafts to both of said cursors.

5. A system for providing a remote indication of the position of a point on a reference plane such as a luminous spot on the screen of a cathode ray indicator tube, including a cursor adjacent said plane and provided with a linear index which is radial to a central reference point on said plane, said cursor being rotatable about said reference point, a second cursor adjacent said first cursor and provided with an index in the form of a spiral, said second cursor being rotatable about said reference point with respect to said first cursor, at least two further cursors similar to said first and second cursors respectively but at a location where said remote indication is to be provided, and means rotating said further cursors in accordance with the rotations of the respective first and second cursors.

6. In apparatus for positioning two shafts respectively in accordance with the value of the angular deviation of a point from a reference line position on a reference surface and with the radial distance of said point with respect to a center reference point on said reference surface, two cursors adjacent said surface and respectively rotatable about said reference point as a center in accordance with said angular deviation and said radial distance, said cursors bearing respective indices which intersect at a single point whose angular deviation with respect to said reference depends on the angular position of one of said cursors and whose radial distance from said central point depends on the relative angular positions of said cursors, and means coupling the first of said shafts to said cursor that is rotatable in accordance with said angular deviation, and means coupling the other of said shafts to both of said cursors differentially so that its rotational position is proportional to the difference in the angular positions of said cursors.

JOSEPH I. HERZLINGER.

REFERENCES CITED

The following references are of record in the file of this patent:

UNITED STATES PATENTS

| Number | Name | Date |
|---|---|---|
| 1,528,772 | Kaminski | Mar. 10, 1925 |
| 1,985,266 | Smith et al. | Dec. 25, 1934 |
| 2,360,361 | Mountbatten | Oct. 17, 1944 |
| 2,402,688 | Skurnick | June 25, 1946 |
| 2,426,245 | Skellett | Aug. 26, 1947 |
| 2,427,019 | Norwood | Sept. 9, 1947 |
| 2,479,569 | Harschel | Aug. 23, 1949 |